US010771971B2

(12) United States Patent
Salloum (10) Patent No.: US 10,771,971 B2
(45) Date of Patent: Sep. 8, 2020

(54) SECURED MULTI-FACTOR AUTHENTICATION

(71) Applicant: Samuel Salloum, Dearborn, MI (US)

(72) Inventor: Samuel Salloum, Dearborn, MI (US)

( * ) Notice: Subject to any disclaimer, the term of this patent is extended or adjusted under 35 U.S.C. 154(b) by 165 days.

(21) Appl. No.: 15/787,292

(22) Filed: Oct. 18, 2017

(65) Prior Publication Data

US 2019/0116494 A1 Apr. 18, 2019

(51) Int. Cl.
*H04W 12/06* (2009.01)
*H04L 29/06* (2006.01)
*H04L 29/08* (2006.01)
*H04W 4/14* (2009.01)

(52) U.S. Cl.
CPC ........... *H04W 12/06* (2013.01); *H04L 63/068* (2013.01); *H04L 63/0838* (2013.01); *H04L 63/0853* (2013.01); *H04L 63/18* (2013.01); *H04L 63/0846* (2013.01); *H04L 67/306* (2013.01); *H04L 2463/082* (2013.01); *H04W 4/14* (2013.01)

(58) Field of Classification Search
CPC ........ H04W 12/06; H04W 4/14; H04L 63/18; H04L 63/0838; H04L 63/068; H04L 63/0853; H04L 63/0846; H04L 2463/082; H04L 67/306
See application file for complete search history.

(56) References Cited

U.S. PATENT DOCUMENTS

| 9,866,551 | B2 | 1/2018 | Hwang et al. | |
| 2009/0106827 | A1 | 4/2009 | Cerruti et al. | |
| 2011/0179478 | A1* | 7/2011 | Flick | H04L 9/0822 726/9 |
| 2013/0124292 | A1* | 5/2013 | Juthani | H04L 63/083 705/14.26 |
| 2013/0179954 | A1* | 7/2013 | Bidare | H04L 63/18 726/7 |
| 2014/0115341 | A1* | 4/2014 | Robertson | H04L 9/3228 713/183 |

FOREIGN PATENT DOCUMENTS

| EP | 1634133 B1 | 5/2008 |
| KR | 10-1051407 B1 | 7/2011 |
| KR | 10-1519301 B1 | 5/2015 |
| WO | 2013-173986 A1 | 11/2013 |

OTHER PUBLICATIONS

Written Opinion and Search Report for corresponding application No. PCT/US2018/056470, dated Mar. 19, 2019.

* cited by examiner

*Primary Examiner* — Khoi V Le
(74) *Attorney, Agent, or Firm* — Dickinson Wright PLLC; Steven Hurles (57) ABSTRACT

The aspects disclosed herein are directed to systems and methods for employing multi-factor authentication for the transfer of goods or information. By employing the aspects disclosed herein, the authentication may become more secure and less vulnerable to attacks by unauthorized parties. The aspects disclosed herein may be implemented as a thin-client implementation, or a thick-client implementation.

12 Claims, 7 Drawing Sheets

SECURED MULTI-FACTOR AUTHENTICATION

BACKGROUND

The transfer of information or goods often times requires authentication to ensure that the information or goods are properly delivered to authorized parties, and not delivered to wrong parties, or even worse, adverse parties trying to obtain access to the information or goods through malfeasance.

Thus, conventional techniques for transferring information or goods rely on robust authentication techniques. Authentication is the process of identifying an individual or party, usually relying upon on a username and password. Authentication is based on the idea that each individual user will have unique information that sets him or her apart from other individuals.

Logically following, an individual providing authentication awaits authorization. Authorization is the process of granting or denying an individual access to the information or goods (or e.g. network resources), once the individual has been authenticated, such as through the username and password. The amount of information and the amount of services the individual has access to depends on the individual's authorization level. In computer technology, an "identity' is the unique name of a person, device, or the combination of both that is recognized by a system. Many types of network management systems rely on unique identities to ensure the security of the network and its resources.

Figure 1A:
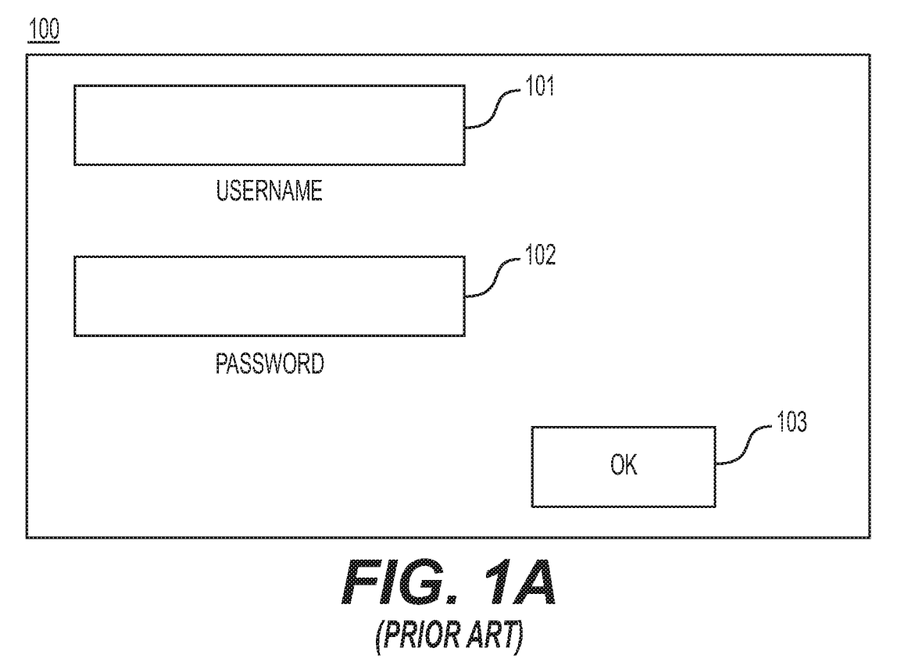
FIGS. 1(a) and (b) illustrate existing authentication schemes known in the prior art.

FIG. 1(a) illustrates a prior art implementation of an authentication scheme 100. As shown, a user may enter a username 101, a password 102, and assert a confirmation element 103 after doing so. If the username and password are determined to be allowed, the user is allowed access to the information or goods associated with the authentication scheme 100.

A system may also employ "two factor authentication", also called T-FA or dual factor authentication, when it requires at least two of the authentication form factors mentioned above. This contrasts with traditional password authentication, which requires only one authentication factor (such as knowledge of a password) in order to gain access to a system. Common implementations of two-factor authentication use 'something you know' (a password) as one of the two factors, and use either 'something you have' (a physical device) or 'something you are' (a biometric such as a fingerprint) as the other factor. A common example of T-FA is an ATM card wherein the card itself is the physical "something you have" item, and the personal identification number (PIN) is the "something you know" password that goes with it.

Using more than one factor is also called strong authentication; using just one factor, for example just a static password, is considered by some to be weak authentication.

Figure 1B:
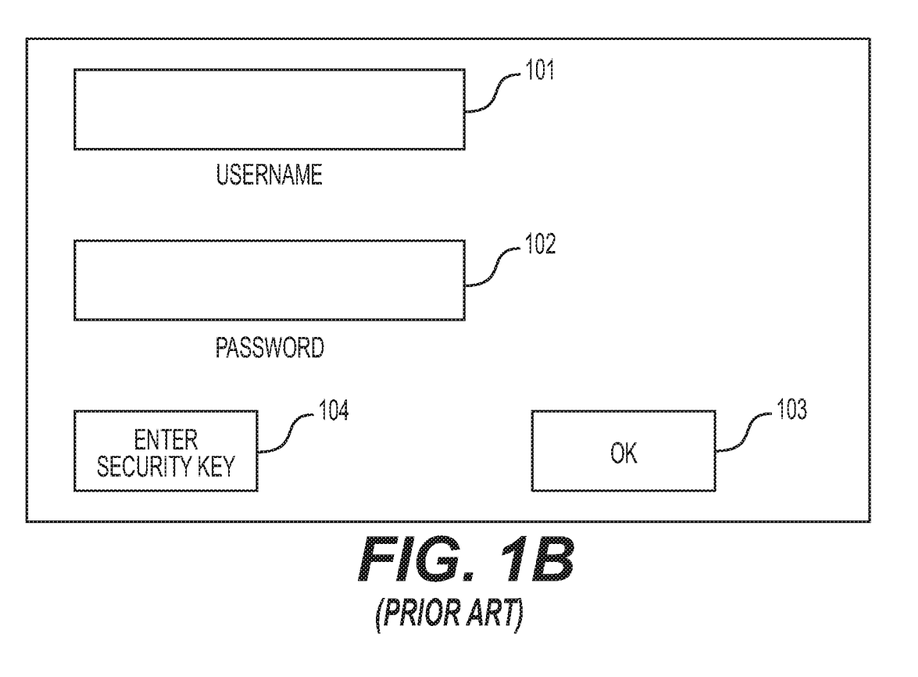

FIG. 1(b) illustrates a two-factor authorization scheme according to a prior art implementation. Additional to scheme 100, an option to upload a security key 104 is also required. This security key may be an encrypted file previously communicated from the source of the information or goods desired to be shared.

The challenges with any implementer of an authentication regime are that parties attempting to violate security are routinely finding new and improved methods for detecting and defeating the various authentication techniques. For example, if a user types a password into a form for entering authentication, the violating party may track key strokes through an intercepting device, or employ a video camera to automatically view the user entering said password into the system.

In another example, a violating party may employ "spoofing". A spoofing attack is defined as a situation in which one person or program successfully masquerades as another by falsifying data, thereby gaining an illegitimate advantage.

As such, ensuring secure transfer of information or goods becomes more difficult as the violating parties improve their technology for defeating current authentication schemes.

SUMMARY

The following description relates to systems, devices, and methods providing a multi-factor authentication system.

Further objects, features and advantages of this invention will become readily apparent to persons skilled in the art after a review of the following description, with reference to the drawings and claims that are appended to and form a part of this specification.

DETAILED DESCRIPTION

The invention is described more fully hereinafter with references to the accompanying drawings, in which exemplary embodiments of the invention are shown. This invention may, however, be embodied in many different forms and should not be construed as limited to the embodiments set forth herein. Rather, these exemplary embodiments are provided so that this disclosure is thorough, and will fully convey the scope of the invention to those skilled in the art. It will be understood that for the purposes of this disclosure, "at least one of each" will be interpreted to mean any combination the enumerated elements following the respective language, including combination of multiples of the enumerated elements. For example, "at least one of X, Y, and Z" will be construed to mean X only, Y only, Z only, or any combination of two or more items X, Y, and Z (e.g. XYZ, XZ, YZ, X). Throughout the drawings and the detailed description, unless otherwise described, the same drawing reference numerals are understood to refer to the same elements, features, and structures. The relative size and depiction of these elements may be exaggerated for clarity, illustration, and convenience.

As explained in the Background section, ensuring secure authentication and authorization is paramount in providing a stable and usable transfer of information or goods. The authentication regimes in place may be employed to allow the transfer of digital data, physical goods, or access to services/location (both virtual and real world, to a network, or peer-to-peer).

However, as authentication and authorization techniques improve, so does the technologies employed to violate security. As such, there is a constant struggle between improving security enough so that the respective violating parties are successfully thwarted.

Disclosed herein are systems and methods for providing multi-factor authentication in an innovative matter to render conventional breaching techniques futile. By employing the collection of techniques described herein, and several of the factors newly described, an implementer of an authentication system may ensure a higher form of protection than without.

Further, the aspects disclosed herein may employ conventional interfaces and techniques already provided with existing authentication systems, and as such, implementation may be both convenient and cost-effective.

Figure 2:
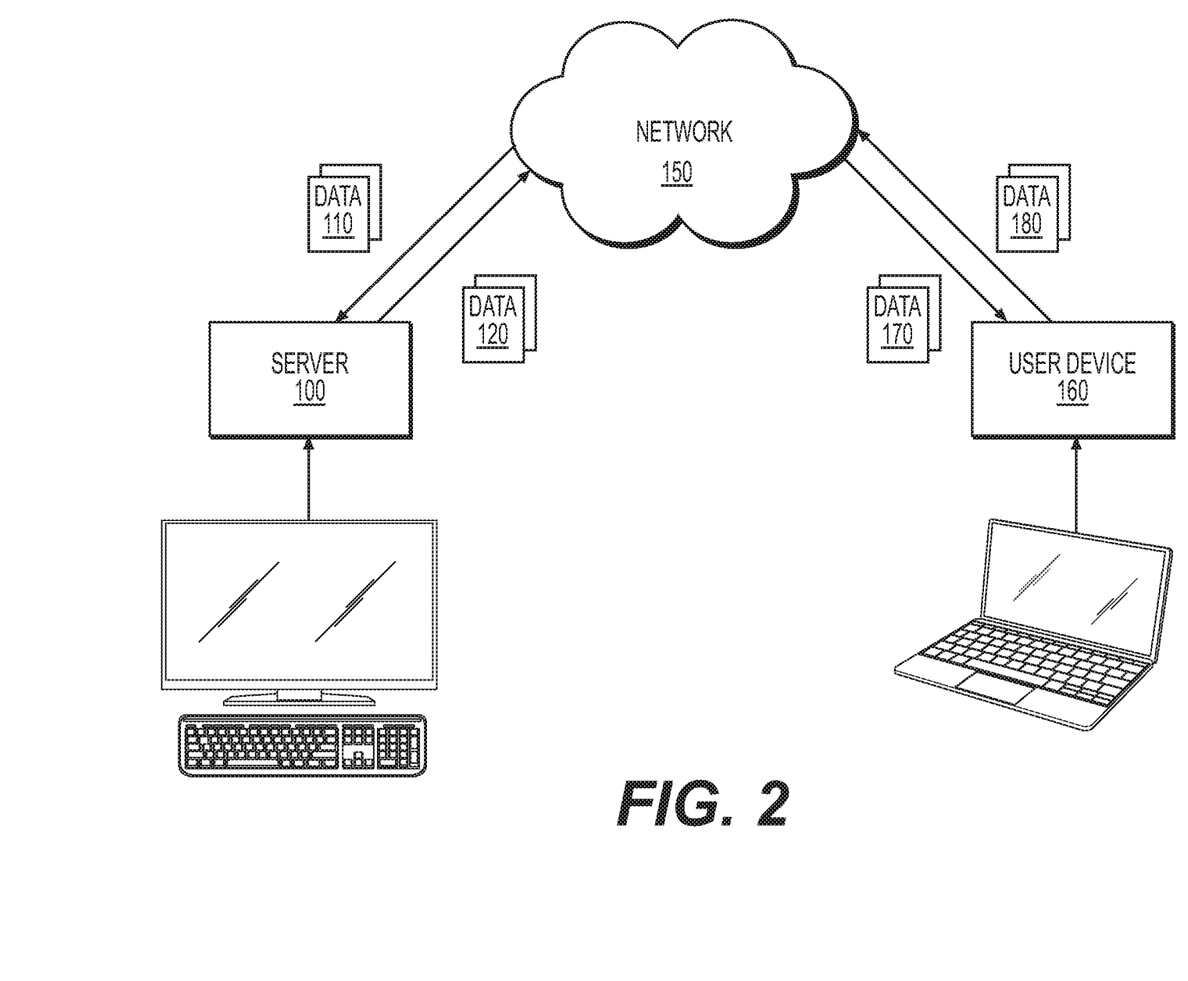
FIG. 2 illustrates a high-level diagram illustrating network topology of the aspects disclosed herein.

FIG. 2 illustrates a high-level diagram illustrating network topology of the aspects disclosed herein. This is merely one illustration, and those skilled in the art may employ analogous topologies employing the aspects described herein.

Referring to FIG. 2, a server 100 is shown in a communicable relationship with network 150. The server 100 may be any known computing device capable of hosting an authentication system, such as those describe in the Background, and the one described herein.

While FIG. 2 illustrates a single server 100, the server 100 may be a collection of devices, a collection of data stored via a network or cloud-based solution, or any known techniques for implementing a centralized or decentralized host for an authentication system.

The network 150 may be any known network in which communication is achieved from multiple devices. Known networks such as the Internet, a local area network (LAN), or the like may be employed. Additionally, networks not specifically enumerated, but generally known, may also be applied.

Additionally shown is a user device 160. The user device 160 may be a computer, a laptop, a smart phone, a tablet, or any other device employable by an individually to establish a communicative relationship via the server 100, via the network 150. As shown, the server 100 may send/receive data 110/120 to the network 150, which may be eventually re-routed or sourced from the user device 160. Similarly, the user device 160 may send/receive data 170/180 to the network 150 in a similar fashion.

Thus, the various authentication systems employed on server 100 may be communicated, via the network 150, to the user device 160. After which, the user 160 may perform certain tests to verify an identity, which are communicated back to the server 100 for authorization.

Figure 3:
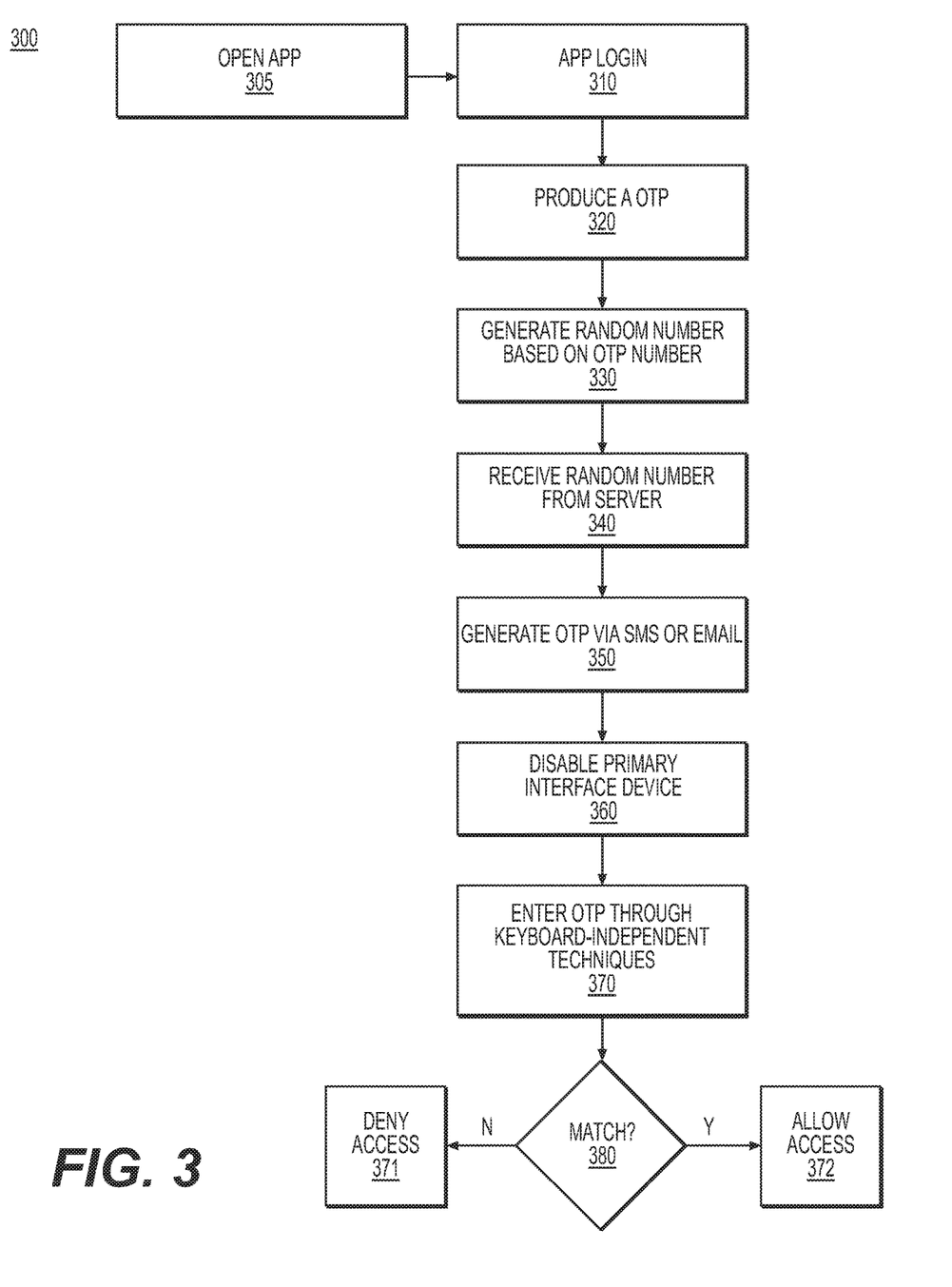
FIG. 3 illustrates flowchart of a factor according to an embodiment of the aspects described herein.

FIG. 3 illustrates flowchart 300 of a factor according to an embodiment of the aspects described herein. Various aspects of the flowchart 300 are implemented on either the server 100 or the user device 160.

In operation 305, a command indicating that an application is to be opened is received (via a server or another receiving entity). This application may be any application associated with the authentication described herein. In operation 320, an application login may be presented (via the client device).

In operation 320, a server 100 produces a one-time password (OTP) based on a request from a user device 160, via network 150. The request may be manually entered based on the user sending a message, or alternatively, may automatically be instigated when an application is opened or executed.

In operation 330, at the server 100, a random number/code is generated based on the produced OTP and customized to be decoded from the application being executed on the user device 160. As such, only the application executed on user device 160 may correctly decode the random number/code to produce the OTP produced in operation 310.

In one example, the random number/code may be 12 characters per every digit of the OTP. Accordingly, if the OTP is 5 characters, the random number/code would be 60 digits. The number 12 in this example is exemplary, and an implementer of the aspects disclosed herein may select another number.

In operation 340, the user device 160 receives the random number/code from the server 100. The random number is preferably received through a communication technique independent the application being run on the user device 160. For example, the random number may be communicated via email or text. The application associated with decoding the random number/code may execute or open (in operation 340). In certain embodiments, the user device 160 may require an authentication step prior to operation 340 (operation 335).

The authentication performed via the application may be any known authentication techniques currently employed. For example, the server 100 may authenticate a user/password entered via user device 160.

In operation 350, a one-time password (OTP) may be received via a different communication technique, such as a SMS or email. The OTP may be displayed or shared for a limited amount of time based on a predetermined setting by an implementer of the authentication system.

In operation 360, the primary interface device associated with the user is disabled (most commonly a keyboard or similar device). Thus, as explained below, the user will have to enter the OTP via a non-keyboard technique.

In operation 370, the individual associated with the user device 160 may enter in the OTP via a non-keyboard technique, or independent any sort of interface device provided along with the user device 160. Thus, a customizable user interface may be provided to enter the OTP.

Figure 5:
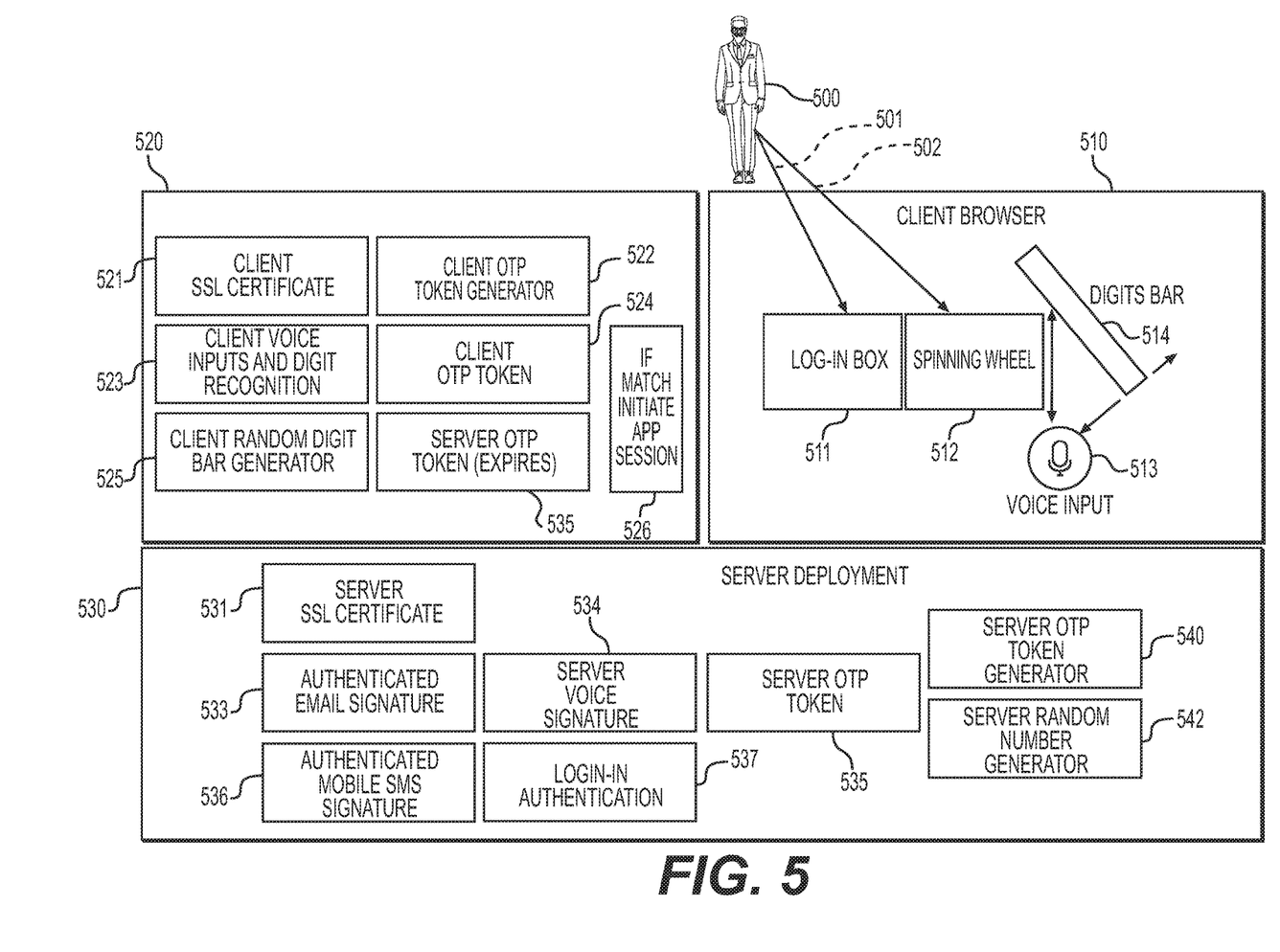
FIG. 5 illustrates a thick-client deployment of the system/method described in FIG. 3.
Figure 6:
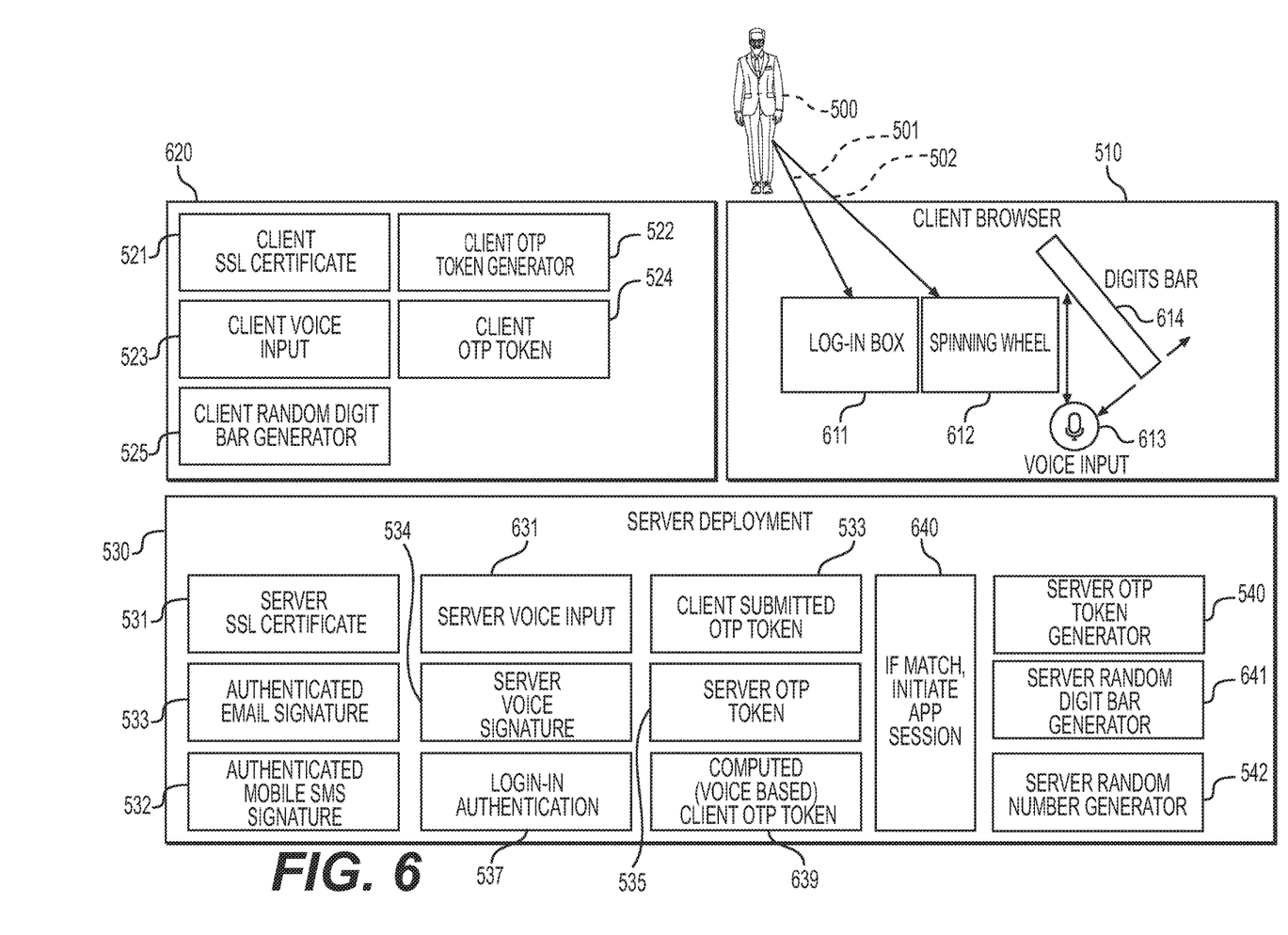
FIG. 6 illustrates a thin-client deployment of the system/method described in FIG. 3

After operation 370, the user entered OTP is mapped into a client generated random number. In operation 380, a determination is made as to whether the user-entered OTP (after being mapped) matches the server generated random number. FIGS. 5 and 6 illustrates both a client-side and server-side implementation of the method 300 described above.

Figure 4A:
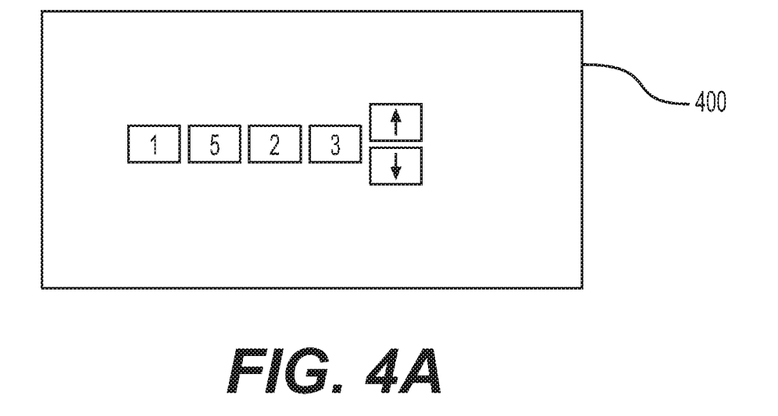
FIGS. 4(a)-(c) illustrates examples of non-keyboard techniques employable by an implementer of the system described herein.
Figures 4B, 4C:
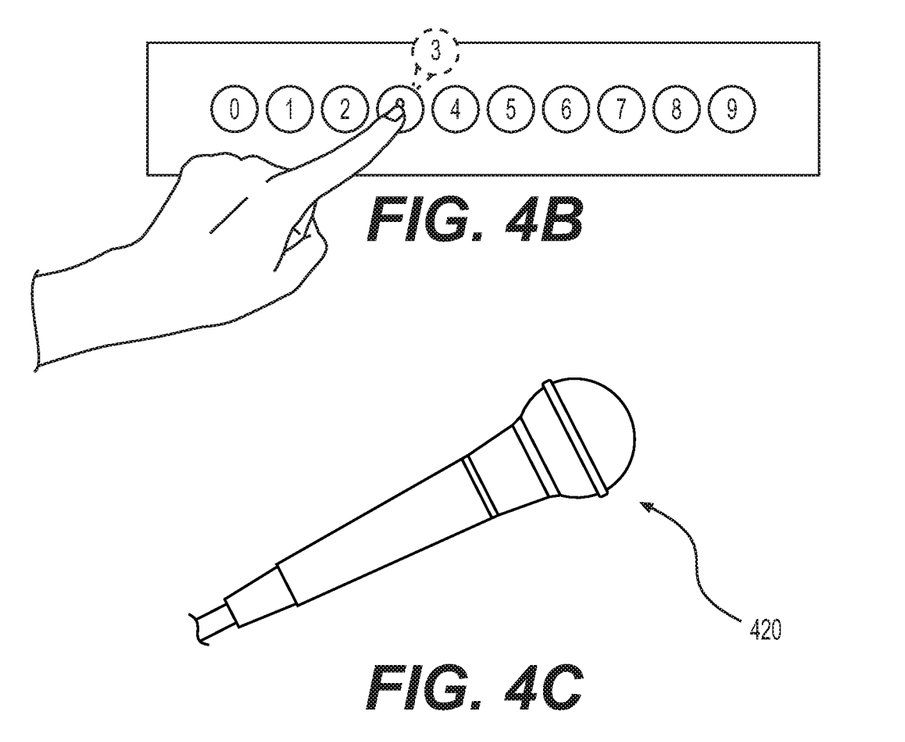

FIGS. 4(a)-(c) illustrates examples of non-keyboard techniques employable by an implementer of the system described herein. Referring to FIG. 4(a), a spinning wheel graphical user interface (GUI) 400 is shown. Thus, a user asserts either an up or down toggle switch to change the digit or character being shown on the spinning wheel GUI 400, thereby arranging the shown items in the fashion which matches the OTP.

In FIG. 4(b), a digit bar 410 is shown. Thus, the individual may select various digits or characters via the digit bar 410 to match the OTP generated via the application.

In FIG. 4(c), the user device 160 may be equipped with a microphone 420. Accordingly, an individual, via the user device 160, may vocalize the OTP via microphone 420.

After operation 360, if the server is able to authorize the individual, the information or goods associated with the transfer is delivered to the individual (370). Thus, the user device 160 may be denied entry/access (if the user-entered OTP does not match the server-generated OTP), or conversely, allowed entry/access.

FIG. 5 illustrates a thick-client deployment of the system/method described in FIG. 3. FIG. 6 illustrates a thin-client deployment of the system described in FIG. 3. A thick-client implementation indicates that a bulk of the application and requisite authentication occurs on the user device 160. A thin-client deployment indicates the converse, so that a bulk of the application is performed on the server 100 (and as such, the user device 160 is merely employed for provide a user interface and certain user-facing applications).

Referring to FIG. 5, a user 500 opens an application 510, with the user interface (UI) 511. The UI 511 may allow a user to enter authentication information, which in turn may be employed by the thick-client deployment system 520. The thick-client deployment system 520 is installed on the user device 160 associated with user 500.

After the user 500 enters the authentication information via UI 511, and is authenticated (537) the thick-client deployment system 531 may handshake with the server through an establishment of a Secure Sockets Layer (SSL) certificate (a client SSL certificate 521 and a server SSL certificate 531 are created to ensure secure communication from the user device 160 to the server 100, via their respective systems 520 and 530). SSL is a standard security technology for establishing an encrypted link between a web server and a browser. This link ensures that all data passed between the server and client devices remain private and integral.

At this point, the server generates a random number mapping for the OTP (542) and similarly, the OTP token is also created (540). In some embodiments, the OTP may be created with a predefined time-out amount, thus, defining a time period in which the token is valid for (535).

The OTP token is sent from the server deployment system 530 to the thick-client deployment system 520.

The random digits associated with the generated OTP are communicated to the user 500 through one of either email (533) or SMS (536). Ideally, the random digits (associated with the OTP) may be communicated through any means independent of the application 510 and thick-client deployment system 520.

As shown by interaction 502, the user 500 is presented a new GUI 512 (spinning wheel), 513 (voice input), or 514 (digits bar). As explained above, the random digits are communicated from the server deployment system 530, and communicated to the user 500. The user 500, with various applications (for example, 523 and 525) provided from the server deployment system 530, may convert the random digits into an OTP. The converted OTP is then used by the user via action 502 to interact with the appropriate provided UI (512, 513, or 514), to allow the user to enter an OTP, and generate a client OTP token generator.

If there is a match between the entered OTP token and the server OTP token, and the server OTP token has not expired, the user 500 is allowed access to the goods or information associated with the transfer (526).

FIG. 6 illustrates a thin-client deployment system 620. The chief difference between the thin-client deployment system 620 and the thick-client deployment system 520 is related to the step of verifying the client-entered OTP token 524 with the server OTP token 535, occurs at the server deployment system 530 (640). Additionally, the various tools for the user to translate a random digit to an OTP may also be sourced on the server-side (631 and 641).

Figure 7A:
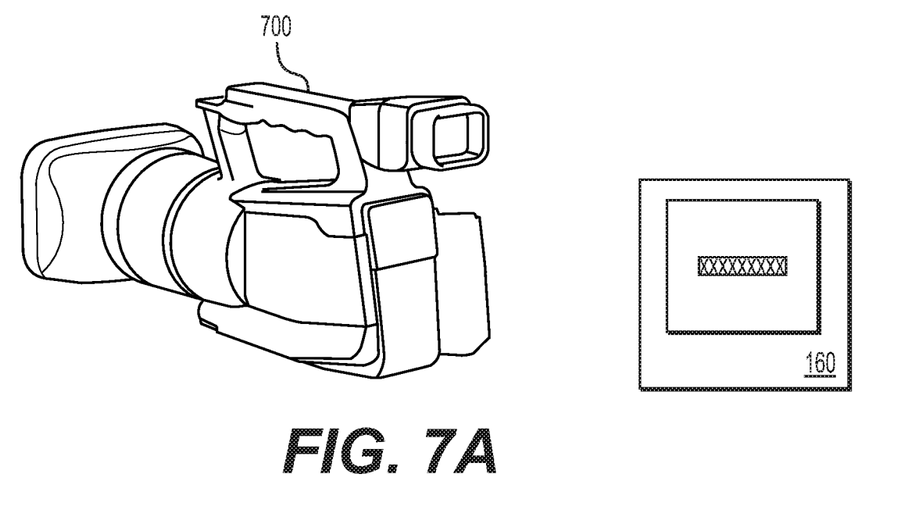
FIGS. 7(a)-(c) illustrate sample implementations of the aspects disclosed herein.
Figure 7B:
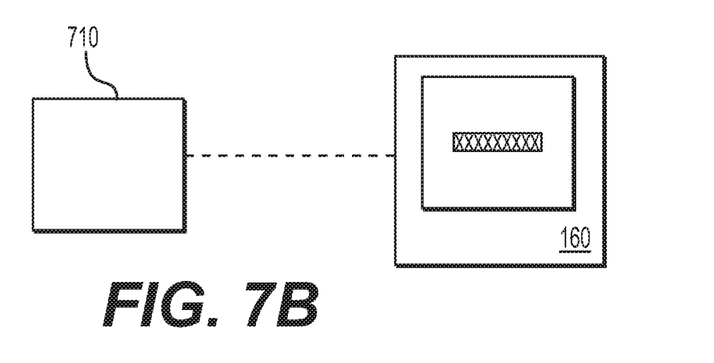
Figure 7C:
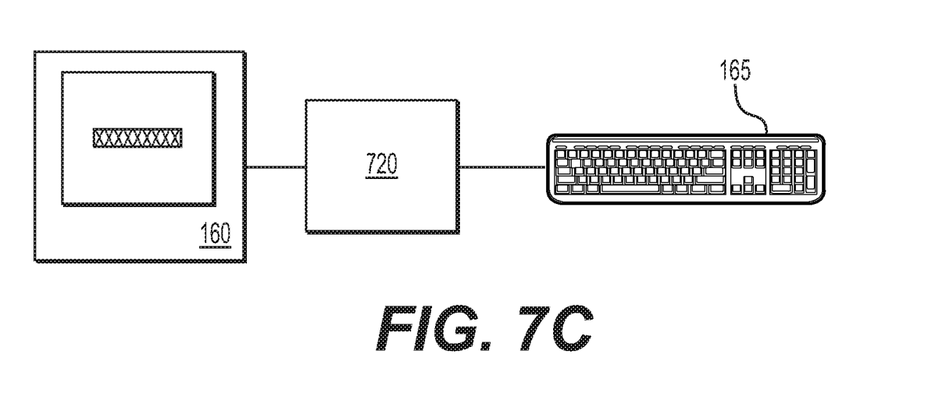

FIGS. 7(*a*)-(*c*) illustrate example implementations in which the systems describe herein may effectively thwart violators or hackers attempting to comprise or spoof entry into a system. Referring to FIG. 7(*a*), a violator may attempt to employ a camera 700 to capture a user 500 entering in a username or password (or OTP). However, because the OTP is keyed for a specific device and a specific random digit, the camera 800's detection of an OTP entered in is rendered useless.

In FIG. 7(*b*), a malicious program 810 may be installed on the user device 160 to detect the OTP. However, once again, because the OTP is keyed to a collection of random digits, the malicious program 810 may detect an OTP, but doing so would be useless.

In FIG. 7(*c*), a keyboard or input sniffer 820 is provided. These devices may automatically detect inputs. However, employing the aspects disclosed herein, these devices 820 are rendered useless due to a) the random digits; and b) the requirement to enter an OTP via a user interface.

Certain of the devices shown include a computing system. The computing system includes a processor (CPU) and a system bus that couples various system components including a system memory such as read only memory (ROM) and random access memory (RAM), to the processor. Other system memory may be available for use as well. The computing system may include more than one processor or a group or cluster of computing system networked together to provide greater processing capability. The system bus may be any of several types of bus structures including a memory bus or memory controller, a peripheral bus, and a local bus using any of a variety of bus architectures. A basic input/output (BIOS) stored in the ROM or the like, may provide basic routines that help to transfer information between elements within the computing system, such as during start-up. The computing system further includes data stores, which maintain a database according to known database management systems. The data stores may be embodied in many forms, such as a hard disk drive, a magnetic disk drive, an optical disk drive, tape drive, or another type of computer readable media which can store data that are accessible by the processor, such as magnetic cassettes, flash memory cards, digital versatile disks, cartridges, random access memories (RAMs) and, read only memory (ROM). The data stores may be connected to the system bus by a drive interface. The data stores provide nonvolatile storage of computer readable instructions, data structures, program modules and other data for the computing system.

To enable human (and in some instances, machine) user interaction, the computing system may include an input device, such as a microphone for speech and audio, a touch sensitive screen for gesture or graphical input, keyboard, mouse, motion input, and so forth. An output device can include one or more of a number of output mechanisms. In some instances, multimodal systems enable a user to provide multiple types of input to communicate with the computing system. A communications interface generally enables the computing device system to communicate with one or more other computing devices using various communication and network protocols.

The preceding disclosure refers to a number of flow charts and accompanying descriptions to illustrate the embodiments represented in FIG. 3. The disclosed devices, components, and systems contemplate using or implementing any suitable technique for performing the steps illustrated in these figures. Thus, FIG. 3 is for illustrative purposes only and the described or similar steps may be performed at any appropriate time, including concurrently, individually, or in combination. In addition, many of the steps in these flow charts may take place simultaneously and/or in different orders than as shown and described. Moreover, the disclosed systems may use processes and methods with additional, fewer, and/or different steps.

Embodiments disclosed herein can be implemented in digital electronic circuitry, or in computer software, firmware, or hardware, including the herein disclosed structures and their equivalents. Some embodiments can be implemented as one or more computer programs, i.e., one or more modules of computer program instructions, encoded on a tangible computer storage medium for execution by one or more processors. A computer storage medium can be, or can be included in, a computer-readable storage device, a computer-readable storage substrate, or a random or serial access memory. The computer storage medium can also be, or can be included in, one or more separate tangible components or media such as multiple CDs, disks, or other storage devices. The computer storage medium does not include a transitory signal.

As used herein, the term processor encompasses all kinds of apparatus, devices, and machines for processing data, including by way of example a programmable processor, a computer, a system on a chip, or multiple ones, or combinations, of the foregoing. The processor can include special purpose logic circuitry, e.g., an FPGA (field programmable gate array) or an ASIC (application-specific integrated circuit). The processor also can include, in addition to hardware, code that creates an execution environment for the computer program in question, e.g., code that constitutes processor firmware, a protocol stack, a database management system, an operating system, a cross-platform runtime environment, a virtual machine, or a combination of one or more of them.

A computer program (also known as a program, module, engine, software, software application, script, or code) can be written in any form of programming language, including compiled or interpreted languages, declarative or procedural languages, and the program can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

To provide for interaction with an individual, the herein disclosed embodiments can be implemented using an interactive display, such as a graphical user interface (GUI). Such GUI's may include interactive features such as pop-up or pull-down menus or lists, selection tabs, scan-able features, and other features that can receive human inputs.

The computing system disclosed herein can include clients and servers. A client and server are generally remote from each other and typically interact through a communications network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

As a person skilled in the art will readily appreciate, the above description is meant as an illustration of implementation of the principles this invention. This description is not intended to limit the scope or application of this invention in that the invention is susceptible to modification, variation and change, without departing from spirit of this invention, as defined in the following claims.

We claim:

1. A method for providing multi-factor authentication at a client to access a server via an authentication process, comprising:
   receiving, via the server, a command indicating an application is opened;
   providing, via the server, an application login;
   generating, via the server, a random number based on a one-time password (OTP) created at the server;
   receiving, via the server, the random number from the server;
   receiving the OTP from the server via a communication technique independent of the client;
   disabling a primary interface device associated with the client prior to the authentication process timing out;
   prompting, via the client, a request to enter the OTP;
   mapping the entered OTP into a client generated random number;
   determining whether the random number from the client generated random number matches the server generated random number mapped to OTP; and
   allowing access from the client in response to the matching being affirmative, wherein an application employed to convert the random number is provided via the server, and generated simultaneously with the generation of the OTP.

2. The method according to claim 1, further comprising prior to receiving the random number, requiring a login via the user device, the login being authenticated by the server.

3. The method according to claim 1, wherein the entry of the client OTP is performed using a secondary user interface that is different from the primary interface device associated with the client.

4. The method according to claim 1, wherein the determination is performed at the server.

5. The method according to claim 1, wherein the determination is performed at the client.

6. The method according to claim 1, wherein the OTP is communicated to the user associated with client, via a medium independent of the client.

7. The method according to claim 6, wherein the communication is through SMS.

8. The method according to claim 6, wherein the communication is through electronic mail.

9. The method according to claim 1, wherein the OTP is configured to expire after a predetermined amount of time.

10. The method according to claim 1, wherein the primary interface device is a keyboard.

11. The method according to claim 3, wherein the secondary user interface is one of a graphical user interface, a voice input, or a digits bar.

12. The method according to claim 1, wherein the random number comprises a predetermined number of digits per every digit of the OTP, wherein the predetermined number of digits is greater than one.

* * * * *